United States Patent
Zhuang

(10) Patent No.: US 12,187,119 B2
(45) Date of Patent: Jan. 7, 2025

(54) AUTOMATIC CORRECTION DEVICE FOR ERRONEOUS ACCELERATION OF AUTOMOBILE

(71) Applicant: Le Zhuang, Hongkong (CN)

(72) Inventor: Le Zhuang, Hongkong (CN)

(73) Assignee: Le Zhuang, Po Lam Metro (HK)

( * ) Notice: Subject to any disclaimer, the term of this patent is extended or adjusted under 35 U.S.C. 154(b) by 0 days.

(21) Appl. No.: 18/596,626

(22) Filed: Mar. 6, 2024

(65) Prior Publication Data

US 2024/0317053 A1    Sep. 26, 2024

(30) Foreign Application Priority Data

Mar. 6, 2023    (CN) .......................... 202320391354.8

(51) Int. Cl.
*B60K 26/02* (2006.01)
*B60K 28/00* (2006.01)
*B60K 28/02* (2006.01)
*B60W 50/14* (2020.01)

(52) U.S. Cl.
CPC .............. *B60K 26/02* (2013.01); *B60K 28/02* (2013.01); *B60W 50/14* (2013.01); *B60K 2028/006* (2013.01)

(58) Field of Classification Search
CPC .. B60K 26/02; B60K 28/02; B60K 2028/006; B60W 50/14; G05G 1/30; G05G 5/03; B60Q 9/00
USPC ........................................................ 180/271
See application file for complete search history.

(56) References Cited

FOREIGN PATENT DOCUMENTS

| | | | | |
|---|---|---|---|---|
| CN | 200948796 | Y | * | 9/2007 |
| CN | 101722855 | A | | 6/2010 |
| CN | 102180151 | A | | 9/2011 |
| CN | 102745075 | A | * | 10/2012 |
| CN | 204641411 | U | | 9/2015 |
| CN | 204956119 | U | * | 1/2016 |
| CN | 108189667 | A | | 6/2018 |
| CN | 213861865 | U | | 8/2021 |
| CN | 219927463 | U | | 10/2023 |
| JP | 3160731 | U | * | 7/2010 |
| JP | 2014151825 | A | | 8/2014 |
| JP | 7177325 | B2 | * | 11/2022 |
| RU | 191548 | U1 | * | 8/2019 |
| WO | WO-2016163662 | A1 | * | 10/2016 ............. B60K 28/10 |

* cited by examiner

*Primary Examiner* — Paul N Dickson
*Assistant Examiner* — Caitlin Anne Miller
(74) *Attorney, Agent, or Firm* — Proi Intellectual Property US

(57) ABSTRACT

The present disclosure discloses an automatic correction device for erroneous acceleration of an automobile, which includes an accelerator pedal, a robotic arm, and an acceleration sensor. The acceleration sensor is connected to a central control computer of the automobile. An error correction control box is arranged on a front cab baffle in front of the robotic arm. An elastic damper having a signal switch is arranged on a side wall of the error correction control box directly facing the robotic arm. The accelerator pedal enables the robotic arm abuts against the elastic damper. When excessive depression is applied, the elastic damper is compressed and deformed by the robotic arm and triggers the signal switch. After the signal switch is triggered, a clear warning sound or a humming sound is sent to prompt a driver to stop the excessive depression.

14 Claims, 1 Drawing Sheet

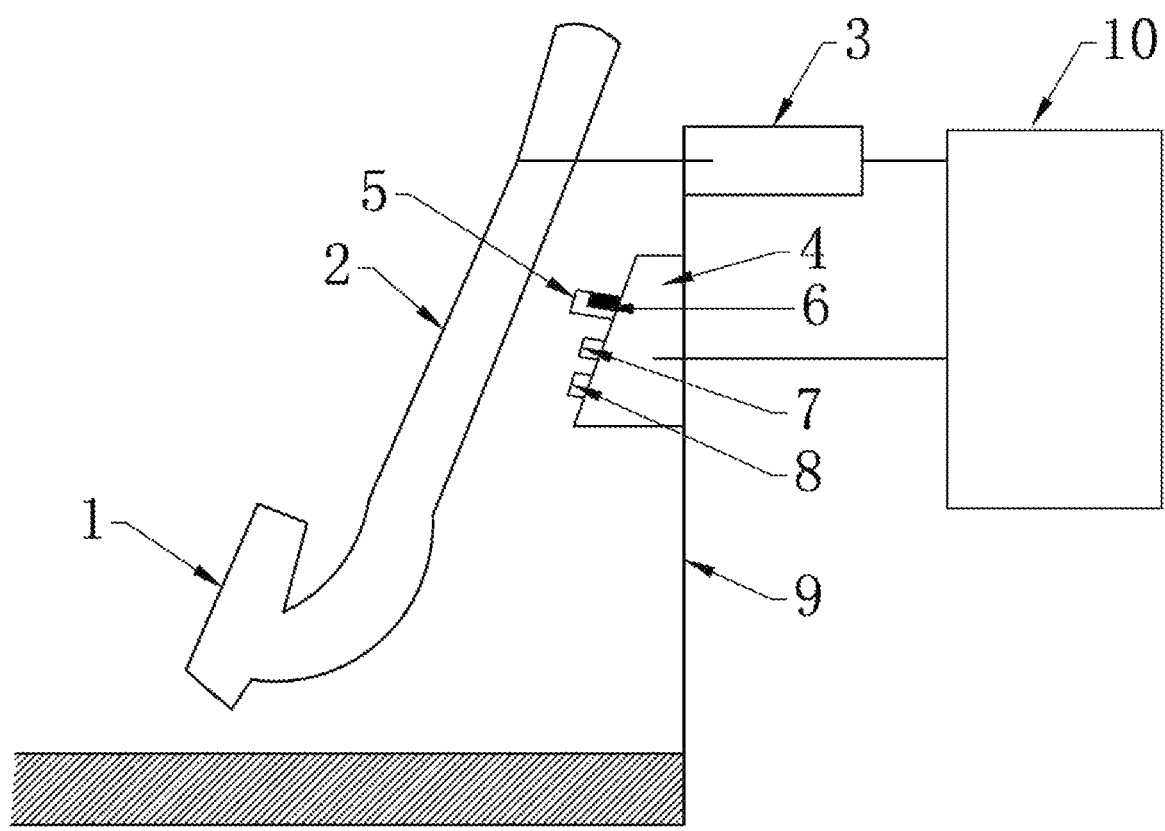

AUTOMATIC CORRECTION DEVICE FOR ERRONEOUS ACCELERATION OF AUTOMOBILE

CROSS REFERENCE TO RELATED APPLICATIONS

The present application claims priority to Chinese Patent Application No. 202320391354.8 filed Mar. 6, 2023 with the China National Intellectual Property Administration. The present application also claims priority to International Patent Application No. PCT/CN2024/072425 filed Jan. 16, 2024 with the World Intellectual Property Organization. The content of these two earlier applications is incorporated herein by reference in their entirety.

TECHNICAL FIELD

The present application relates to the technical field of automobile safety devices, and in particular, to an automatic correction device for erroneous acceleration of an automobile.

BACKGROUND

Since the invention of automobiles, accidents caused by "erroneous acceleration" appear. Over more than 100 years, such accidents are not eliminated or reduced, but instead are becoming increasingly fierce in response to comprehensive popularity of automobiles, an increase in average speeds, strengthening of engine power, and popularity of automatics and electric vehicles, especially general improvement of an instantaneous acceleration ability of automobiles, which results in numerous vicious traffic accidents.

The frequent accidents caused by erroneous acceleration are resulted from the following factors.

I. At the beginning of automobile designing, an accelerator pedal and a braking pedal with completely different functions are arranged side by side and very close to each other, and the two pedals are both manipulated by a right foot through depression, which constitutes a natural condition for erroneous acceleration.

II. Arranging the two pedals with completely different functions highly adapts to a practical need of a driver to flexibly control an automobile, and no better alternative could be found. Even if an alternative is found in the future, the alternative may be in vain. This is because the existing billions of drivers have already established their habits over the years, and the existing billions of automobiles that have been put into an actual use cannot be changed. A complete change will do more harm than good.

III. Based on surface analysis, strengthening training of new drivers can reduce erroneous acceleration. However, in fact, currently, almost all automobile coaches cannot provide standardized and strict training for new trainees in depression of a brake and an accelerator, let alone qualitative, quantitative, and assessable training. Moreover, most new drivers owning a driving license grasp only preliminary skills, and need to learn and consolidate skills during future driving practice, which inevitably causes a high risk.

IV. In a previous patent (ACTION MONITORING SYSTEM FOR RIGHT FOOT OF DRIVER, patent No.: ZL 20212012027.2) of the inventor, qualitative and quantitative scientific assessment is performed on sensitivity and accuracy of actions of a right foot of a driver, which can greatly improve effects of standardized training and accurate assessment performed by coaches for trainees, and can significantly reduce a probability of erroneous acceleration. However, currently, the technology is not popularized to coach automobiles. Even if the technology is popularized in the future, it may be impossible to require the billions of experienced drivers owning a driving license to receive training and assessment again. What's more, erroneous acceleration caused by non-technical factors such as drunk driving, drugged driving, and psychotic episodes exist in society.

Therefore, it can be concluded that such accidents caused by erroneous acceleration cannot be avoided in case of manned driving.

SUMMARY

In view of a practical problem of inevitable erroneous acceleration, the present disclosure provides an automatic correction device for erroneous acceleration of an automobile, to enable an accelerator pedal to have an automatic correction capability to immediately stop an acceleration function and synchronously start an emergency braking function when a driver needs to perform braking but erroneously depresses the accelerator pedal (that is, when "erroneous acceleration" occurs). In this way, major traffic accidents and possible tragic consequences caused by erroneous acceleration can be greatly reduced.

The objective of the present disclosure is realized through the following technical solutions.

An automatic correction device for erroneous acceleration of an automobile includes an accelerator pedal, and a robotic arm connecting the accelerator pedal and an acceleration sensor. The acceleration sensor is connected to a central control computer of the automobile. An error correction control box is arranged on a front cab baffle in front of the robotic arm. An elastic damper having a signal switch is arranged on a side wall of the error correction control box directly facing the robotic arm. The accelerator pedal enables the robotic arm to abut against the elastic damper. When excessive depression is applied, the elastic damper is compressed and deformed by the robotic arm and triggers the signal switch. After the signal switch is triggered, a clear warning sound or a humming sound is sent to prompt a driver to stop the excessive depression.

The error correction control box is connected to the central control computer through a signal line. The signal switch transmits a warning signal to the central control computer after being triggered. The central control computer prompts the driver to stop the excessive depression through a speaker in the automobile.

A first pressure sensor and a second pressure sensor located below the elastic damper are further arranged on the error correction control box. If further excessive depression is applied to the accelerator pedal, the robotic arm touches the first pressure sensor and the second pressure sensor, so that the first pressure sensor outputs an "emergency brake" signal to the central control computer for forced stop, and the second pressure sensor outputs a "power cutoff" signal to the central control computer to stop an acceleration function.

The automobile is a gasoline engine, and the "power cutoff" signal outputted by the second pressure sensor to the central control computer cuts off power supply of a high-voltage ignition coil.

The automobile is a diesel engine, and the "power cutoff" signal outputted by the second pressure sensor to the central control computer cuts off power supply of a high-pressure fuel injection pump.

The automobile is an electric vehicle, and the "power cutoff" signal outputted by the second pressure sensor to the central control computer cuts off power of a driving motor.

In an embodiment, the signal switch is directly arranged as a switch of a buzzer.

An acceleration at the moment when the robotic arm abuts against the elastic damper is considered to reach 100%.

A positioning mechanism configured to control a position of the error correction control box is arranged on the front cab baffle. The positioning mechanism is configured to define the acceleration at the moment when the robotic arm abuts against the elastic damper. An extent to which the positioning mechanism controls an advancement position of the error correction control box is inversely proportional to a decrease in the acceleration at the moment when the robotic arm abuts against the elastic damper.

The positioning mechanism includes a base plate, or a supporting screw, or another similar mechanism. A range of each base plate is limited, and the supporting screw may be relatively precisely adjusted.

The foregoing positioning mechanism is arranged to provide further protection, because the automatic correction device for erroneous acceleration of an automobile provided in the present disclosure can "start emergency measures immediately after power output reaches 100%", which is the last line for operation safety, and is indispensable. However, the last line may be insufficient for a considerable number of new drivers, especially in an existing case that automobiles accelerate increasingly faster from a speed of 0 km/h to a speed of 100 km/h. It is assumed that a base plate of a thickness is used as the positioning mechanism. A power output limit is reduced by 10% after each base plate is added. If three base plates are arranged behind the error correction control box 4, the automobile synchronously takes emergency measures when the power output reaches 70% (in this case, the robotic arm abuts against the elastic damper). In a case of two base plates, the emergency measures are taken when the power output reaches 80%. In a case of one base plate, the emergency measures are taken when the power output reaches 90%. In a case of no base plate, the emergency measures are taken when the power output reaches 100%, that is, designed power. Therefore, the base plates may be arranged based on proficiency of a driver, and then gradually reduced as required, until the base plates are completely omitted. The base plate may be replaced by a screw support, which has substantially the same effect.

An idea of forming the technical solution of the automatic correction device for erroneous acceleration of an automobile in the present disclosure is as follows:

I. It is necessary to face the reality and discard an illusion of completely eliminating erroneous acceleration.

II. A new technical means that enables an accelerator pedal to stop an acceleration function and start an emergency braking function when erroneous acceleration occurs. The action needs to be fully automatic, because a driver in a state of tension and panic actually is unable to actively manipulate any device III. No driver is required to change established normal driving habits and actions. Practices prove that a selectable new "single pedal mode" in electric vehicles may bring potential side effect if inappropriately used.

IV. A new device should make full use of original devices and functions of an automobile to improve reliability of the error correction device, reduce costs of promotion, and realize a probability of failure close to zero.

Compared with the prior art, the present disclosure has the following advantages:

Normal driving actions of a driver are not affected after the automatic correction device for erroneous acceleration of an automobile in the present disclosure is added to an automobile, which exists invisibly like an anti-collision airbag of an automobile without side effects.

The error correction function of the present disclosure is fully automatic. A lot of evidence shows that almost all drivers making erroneous acceleration in panic, including drunk drivers, drugged drivers, and drivers having a psychotic episode apply excessive depression on an accelerator pedal, which will cause the error correction device to start.

According to the automatic correction device for erroneous acceleration of an automobile in the present disclosure, numerous original devices and functions of the automobile are used. The accelerator pedal, the central control computer, and a parking gear P are all existing mature technical devices. The newly added sensor is also a mature technology with high reliability and low costs. The device can be integrally designed in any new automobile, and can be conveniently constructed by adding a controller box to an old automobile.

BRIEF DESCRIPTION OF THE DRAWINGS

FIG. 1 is a schematic structural diagram of an automatic correction device for erroneous acceleration of an automobile according to the present disclosure.

1—Accelerator pedal; 2—Robotic arm; 3—Acceleration sensor; 4—Error correction control box; 5—Elastic damper; 6—Signal switch; 7—First pressure sensor; 8—Second pressure sensor; 9—Front cab baffle; 10—Central control computer.

DETAILED DESCRIPTION

The present disclosure is further described below with reference to drawings and embodiments.

As shown in FIG. 1, an automatic correction device for erroneous acceleration of an automobile includes an accelerator pedal 1, and a robotic arm 2 connecting the accelerator pedal 1 and an acceleration sensor 3. The acceleration sensor 3 is connected to a central control computer 10 of the automobile. An error correction control box 4 is arranged on a front cab baffle 9 in front of the robotic arm 2. The error correction control box 4 is connected to the central control computer 10 through a signal line. An elastic damper 5 having a signal switch 6 is arranged on a side wall of the error correction control box 4 directly facing the robotic arm 2. The accelerator pedal 1 enables the robotic arm 2 to abut against the elastic damper 5. An acceleration at the moment when the robotic arm 2 abuts against the elastic damper 5 is considered to reach 100%. When excessive depression is applied, the elastic damper 5 is compressed and deformed by the robotic arm 2 and triggers the signal switch 6. After the signal switch 6 is triggered, a clear warning sound or a humming sound is sent to prompt a driver to stop the excessive depression. In addition, the signal switch 6 can further transmit a warning signal to the central control computer 10 after being triggered, and the central control computer 10 can prompt the driver to stop the excessive depression through a speaker in the automobile.

Further, a first pressure sensor 7 and a second pressure sensor 8 located below the elastic damper 5 are further arranged on the error correction control box 4. If excessive depression is applied to the accelerator pedal 1, the robotic arm 2 can touch the first pressure sensor 7 and the second pressure sensor 8, so that the first pressure sensor 7 outputs an "emergency brake" signal to the central control computer 10 for forced stop, and the second pressure sensor 8 outputs a "power cutoff" signal to the central control computer 10 to stop an acceleration function. When the automobile is a gasoline engine, the "power cutoff" signal outputted by the second pressure sensor 8 to the central control computer 10 cuts off power supply of a high-voltage ignition coil. When the automobile is a diesel engine, the "power cutoff" signal outputted by the second pressure sensor 8 to the central control computer 10 cuts off power supply of a high-pressure fuel injection pump. When the automobile is an electric vehicle, the "power cutoff" signal outputted by the second pressure sensor 8 to the central control computer 10 cuts off power of a driving motor.

In the foregoing device, the elastic damper 5, the first pressure sensor 7, and the second pressure sensor 8 are all arranged on the error correction control box 4.

An operating principle of the automatic correction device for erroneous acceleration of an automobile in the present disclosure is as follows:

I. The accelerator pedal 1 is depressed, so that the robotic arm 2 swings rightward to drive the acceleration sensor 3 to start operating. The operating principle is completely the same as that of the original automobile design.

II. When the acceleration is close to 100%, the robotic arm 2 further swings rightward and abuts against the elastic damper 5. The acceleration at the moment when the robotic arm 2 abuts against the elastic damper 5 is considered to reach 100%. In this case, a right foot of the driver feels a slight increase in depression resistance. In this way, a driver in a normal state can maintain the right foot in the acceleration state to continue high-speed travelling.

III. If the driver applies further depression with the right foot, the elastic damper 5 is compressed and deformed, and triggers the signal switch 6. The automobile sends a clear warning sound or a humming sound to prompt the driver to stop the excessive depression.

IV. If the driver applies further depression with the right foot (which is an abnormal excessive acceleration action), it may be theoretically considered as an erroneous action of the driver. The robotic arm 2 immediately triggers the first pressure sensor 7 and the second pressure sensor 8.

V. The first pressure sensor 7 and the second pressure sensor 8 immediately output signals to the central control computer 10. The first pressure sensor 7 outputs "emergency braking" (which is equivalent to touching and holding a P button) to the central control computer 10 for forced stop. The second pressure sensor 8 outputs a "power cutoff" signal to the central control computer 10, and stops the acceleration function. If the automobile is a gasoline engine, the "power cutoff" signal cuts off power supply of a high-voltage ignition coil. If the automobile is a diesel engine, the "power cutoff" signal cuts off power supply of a high-pressure fuel injection pump. If the automobile is an electric vehicle, the "power cutoff" signal cuts off power of a driving motor. In this way, the automobile immediately loses power supplement and implements braking, so that the automobile can stop as soon as possible.

It should be emphasized that the foregoing operating principle is elaborated in a case that the positioning mechanism is not arranged. When the positioning mechanism is arranged, 100% in the foregoing operating principle is a value less than 100%.

It should be noted that, accidents caused by erroneous acceleration are usually major accidents or at least potential major accidents. Therefore, when the accelerator pedal 1 is released, a broadcasting device or a buzzer controlled by the signal switch 6 is automatically disabled, the functions of the first pressure sensor 7 and the second pressure sensor 8 cannot be automatically canceled and need to be reset manually. In this way, a time for forced settling down is provided for the driver in a panic state.

According to the automatic correction device for erroneous acceleration of an automobile in the present disclosure, when a driver makes erroneous acceleration, the error correction function can automatically take effect in time, so that absurd accidents such as an accident that an automobile runs widely by a long distance of 2.6 kilometers as a result of erroneous acceleration never happen again. Mounting the error correction control box 4 in the automobile does not affect any normal driving action of the driver, which exists invisibly like an airbag and has no side effects. The automatic correction device for erroneous acceleration of an automobile mainly uses original devices and functions of the automobile, which has high reliability and low costs. The device can be integrally designed in any new automobile, and can be conveniently constructed by adding an error correction control box 4 to an old automobile.

The foregoing embodiments are merely used for illustrating the technical idea of the present disclosure, and cannot be used for limiting the protection scope of the present disclosure. Any changes made on the technical solutions based on the technical idea proposed in the present disclosure fall within the protection scope of the present disclosure. Technologies not involved in the present disclosure can be realized through the prior art.

What is claimed is:

1. An automatic correction device for erroneous acceleration of an automobile, comprising an accelerator pedal, and a robotic arm connecting the accelerator pedal and an acceleration sensor, wherein the acceleration sensor is connected to a central control computer of the automobile, an error correction control box is arranged on a front cab baffle in front of the robotic arm, an elastic damper having a signal switch is arranged on a side wall of the error correction control box directly facing the robotic arm, the accelerator pedal enables the robotic arm to abut against the elastic damper, when excessive depression is applied, the elastic damper is compressed and deformed by the robotic arm and triggers the signal switch, and after the signal switch is triggered, a clear warning sound or a humming sound is sent to prompt a driver to stop the excessive depression.

2. The automatic correction device for erroneous acceleration of an automobile according to claim 1, wherein the error correction control box is connected to the central control computer through a signal line, the signal switch transmits a warning signal to the central control computer after being triggered, and the central control computer prompts the driver to stop the excessive depression through a speaker in the automobile.

3. The automatic correction device for erroneous acceleration of an automobile according to claim 1, wherein a first pressure sensor and a second pressure sensor located below the elastic damper are further arranged on the error correction control box, and if further excessive depression is applied to the accelerator pedal, the robotic arm touches the first pressure sensor and the second pressure sensor, so that the first pressure sensor outputs an "emergency brake" signal to the central control computer for forced stop, and the second pressure sensor outputs a "power cutoff" signal to the central control computer to stop an acceleration function.

4. The automatic correction device for erroneous acceleration of an automobile according to claim 3, wherein the automobile is a gasoline engine, and the "power cutoff" signal outputted by the second pressure sensor to the central control computer cuts off power supply of a high-voltage ignition coil.

5. The automatic correction device for erroneous acceleration of an automobile according to claim 3, wherein the automobile is a diesel engine, and the "power cutoff" signal outputted by the second pressure sensor to the central control computer cuts off power supply of a high-pressure fuel injection pump.

6. The automatic correction device for erroneous acceleration of an automobile according to claim 3, wherein the automobile is an electric vehicle, and the "power cutoff" signal outputted by the second pressure sensor to the central control computer cuts off power of a driving motor.

7. The automatic correction device for erroneous acceleration of an automobile according to claim 1, wherein the signal switch is a switch of a buzzer.

8. The automatic correction device for erroneous acceleration of an automobile according to claim 1, wherein an acceleration at the moment when the robotic arm abuts against the elastic damper is considered to reach 100%.

9. The automatic correction device for erroneous acceleration of an automobile according to claim 1, wherein a positioning mechanism configured to control a position of the error correction control box is arranged on the front cab baffle, and the positioning mechanism is configured to define the acceleration at the moment when the robotic arm abuts against the elastic damper.

10. The automatic correction device for erroneous acceleration of an automobile according to claim 9, wherein the positioning mechanism comprises a base plate or a supporting screw.

11. The automatic correction device for erroneous acceleration of an automobile according to claim 2, wherein a first pressure sensor and a second pressure sensor located below the elastic damper are further arranged on the error correction control box, and if further excessive depression is applied to the accelerator pedal, the robotic arm touches the first pressure sensor and the second pressure sensor, so that the first pressure sensor outputs an "emergency brake" signal to the central control computer for forced stop, and the second pressure sensor outputs a "power cutoff" signal to the central control computer to stop an acceleration function.

12. The automatic correction device for erroneous acceleration of an automobile according to claim 11, wherein the automobile is a gasoline engine, and the "power cutoff" signal outputted by the second pressure sensor to the central control computer cuts off power supply of a high-voltage ignition coil.

13. The automatic correction device for erroneous acceleration of an automobile according to claim 11, wherein the automobile is a diesel engine, and the "power cutoff" signal outputted by the second pressure sensor to the central control computer cuts off power supply of a high-pressure fuel injection pump.

14. The automatic correction device for erroneous acceleration of an automobile according to claim 11, wherein the automobile is an electric vehicle, and the "power cutoff" signal outputted by the second pressure sensor to the central control computer cuts off power of a driving motor.

\* \* \* \* \*